May 1, 1934. F. A. DEUTSCH 1,956,712

SHOCK ABSORBER

Filed Aug. 16, 1933

Inventor:
Fritz Albert Deutsch

Patented May 1, 1934

1,956,712

UNITED STATES PATENT OFFICE 1,956,712

SHOCK ABSORBER

Fritz Albert Deutsch, Berlin, Germany

Original application November 16, 1931, Serial No. 575,385. Divided and this application August 16, 1933, Serial No. 685,381. In Germany November 12, 1930

5 Claims. (Cl. 267—11)

My invention relates to shock absorbers, and more particularly fluid operated shock absorbers, such as described in my application for patent, Serial No. 575,385, filed on November 16, 1931, of which this is a division.

The object of the present invention is to provide on a motor vehicle two opposed shock absorbers so designed as to produce, in addition to their shock absorbing function, a stabilizing effect so as to effectively resist any tendency of the vehicle body to turn over about its longitudinal axis, as the vehicle is driven around curves, whereby safety in driving a motor vehicle is considerably enhanced.

The two shock absorbers, moreover, are so constructed that as long as they operate in the same direction, they function upon the expansion of the vehicle springs independently of each other purely as shock absorbers with full effect, while upon spring compression, their shock-absorbing function is only slight. However, the combined two shock absorbers are so connected that in the event of the two shock absorbers moving in opposite direction, in which case only one of the shock absorbers operates with full effect, the latter, by means of said connection, acts upon an element of the other shock absorber in such a way that also said other shock absorber operates with full effect, whereby any tendency of the vehicle body to turn over is positively opposed by both shock absorbers and the stability of the vehicle thus is at all times insured.

Furthermore, a means is provided whereby the stabilizing action of the two shock absorbers is made entirely independent of the adjustment of the effectiveness of their shock-absorbing function, so that the maximum stabilizing effect is always maintained.

Figure 1:
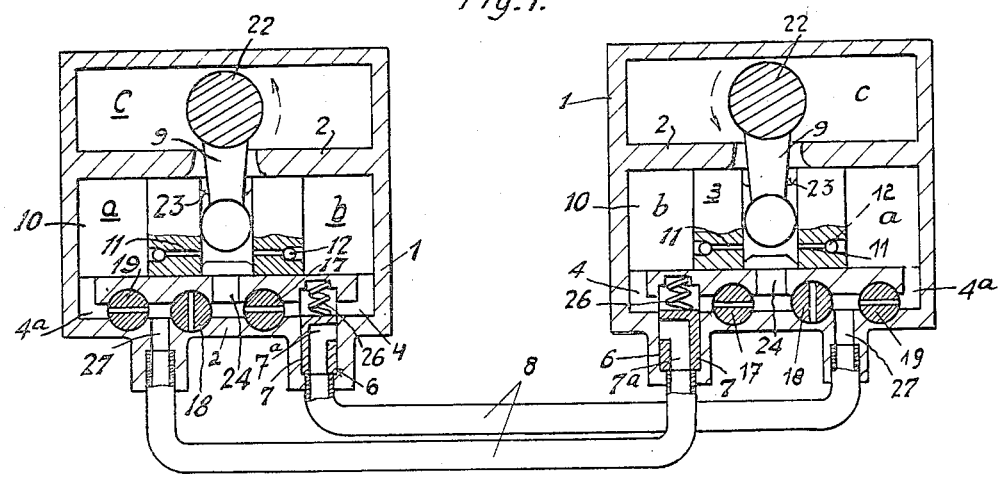
Figures 3, 4, 5:
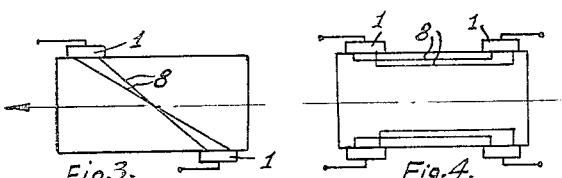
Figure 2:
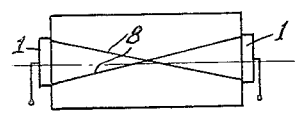

On the attached drawing, on which I have illustrated my invention somewhat diagrammatically by way of various embodiments, Fig. 1 is a sectional view of two interconnected fluid-operated shock absorbers adapted to act singly as shock absorbers and combined as a stabilizer; Fig. 2 is a sectional detail view of a throttling element adapted to be used in place of the throttling element shown in Fig. 10; and Figs. 3, 4 and 5 are small diagrams illustrating the manner, in which the two shock absorbers may be mounted on a motor vehicle.

In Figure 1 two interconnected shock absorbers are shown. Each shock absorber comprises a casing 1 which, by a partition wall 2, is divided into a cylinder 10 and a refill chamber C. Within the cylinder 10 is a piston 3 which, by an arm 9, is connected with a shaft 22 which is understood to be suitably coupled with the axle or chassis of a vehicle so that the piston is moved in one direction or the other depending upon whether the vehicle springs are being compressed or are acting expansively. The piston 3 divides the cylinder 10 into what will hereafter be termed high and low pressure chambers designated as $a$ and $b$, respectively, in which connection it is to be understood that when the vehicle springs are undergoing compression the piston 3 is moved into the low pressure chamber $b$, and when the vehicle springs are acting expansively said piston is moved into the high pressure chamber $a$.

The piston 3 is provided medially with an annular channel or the like, designated as 23, which is in substantially constant communication with the refill chamber C through an opening in the wall 2 through which the arm 9 extends. Extending through the piston from each end thereof to the channel 23 are ducts 11, 11, and cooperating with each duct is a check valve 12 which permits flow of fluid from the refill chamber C to the related pressure chamber and which serves to prevent reverse flow of the fluid with which the shock absorber is understood to be charged.

In the casing 1 is formed a duct 24 which is substantially constantly in communication with the refill chamber C through the channel 23 of the piston 3 and which also is in constant communication with a pair of ducts 4, 4a, the former of which leads to the outer end of the low pressure chamber $b$ and the latter of which leads to the outer end of the high pressure chamber $a$.

Disposed transversely with respect to the duct 4 is a valve chamber 6 within which is slidably mounted a valve 7 which, under the influence of a spring 26, tends constantly to assume a position permitting flow of fluid through the duct 4 and which, when moved against the force of the spring 26, is effective to deny flow of fluid through the duct 4 between the duct 24 and the low pressure chamber $b$. In the valve 7 is formed a bore 7a which establishes communication between the low pressure chamber $b$ and the outer end of the valve chamber 6 when the valve is moved inwardly against its spring 26 to deny communication between said low pressure chamber and the refill chamber through the duct 24 and the piston channel 23.

Between the valve chamber 6 and the duct 24 is a valve or throttling element 17 which is provided to control flow of fluid through the duct 4, said element 17 being movable between a position to deny flow of fluid through the duct 4 and a position in which flow of fluid through said duct is permitted through a metering bore formed in said throttling element.

Between the duct 24 and the high pressure chamber $a$ are two spaced apart valve or throttling elements 18 and 19 which are or may be duplicates of the throttling element 17 and which are provided to control flow of fluid through the duct 4a.

Communicating with the duct 4a between the valve or throttling elements 18 and 19 is a duct 27. The duct 27 of each shock absorber is connected by a conduit 8 with the outer end of the valve chamber 6 of the other shock absorber.

The operation of the construction shown in Fig. 1 is as follows:

When the vehicle body, in the case of spring compression, moves downwards, the piston 3 in both shock absorbers, because of a corresponding rotation of the shaft indicated by the circle in the refill chamber $c$, moves toward the low-pressure chamber $b$ and the liquid displaced from this chamber flows through the bore 4 and the throttling element 17 toward the refill chamber $c$. The downward movement of the vehicle body is damped according to the degree of throttling by the throttling element 17.

When the vehicle body, upon the subsequent expansion of the springs, moves upwards, the piston 3 in either shock absorber moves toward the high pressure chamber $a$ therein, and the fluid in said chamber passes through the throttling element 19 and the connecting pipe 8 into the valve chamber of the other shock absorber where it first acts to move the valve 7 of the latter shock absorber to deny flow of fluid through the duct 4 and then is admitted to the low pressure chamber $b$ depending on unfilled space in said chamber. The damping effect resulting therefrom is determined by the throttling element 19.

If the vehicle body tends to tip to one side, the pistons of the two shock absorbers move in opposite direction, and the piston of the shock absorber moving toward the high pressure chamber operates the piston valve 7 of the other shock absorber. The pistons are now working one against the other in a space having no outlet for the fluid, and consequently, the tipping movement of the vehicle body is effectively resisted by both shock absorbers, as above described in connection with the other embodiments.

The closure element 18 is adapted to more or less close the connection between the high pressure chamber and the refill chamber, so that the fluid, which by the pistons in both shock absorbers is simultaneously displaced, when the two shock absorbers act as stabilizers, can escape more or less throttled. By means of this closure element 18, the stabilizing function can be rendered effective or ineffective, or its effectiveness can thereby be regulated.

In Fig. 2 is shown a special construction of the piston valve 7, whereby the throttling element 19 may be dispensed with.

When the springs of the vehicle are compressed, the fluid in the shock absorbers flows from the high pressure chamber toward the low pressure chamber, being throttled by the very narrow bore 20 of the piston valve 7 shown in Fig. 2, while, at the same time, the L-shaped bore in said valve is closed by a ball-valve, 21.

On the return of the flow of fluid from the low pressure chamber to the high pressure chamber, however, the flow remains unthrottled, the ball-valve 21 remaining open.

Figs. 3–5 illustrate in a diagrammatic manner the way, in which the two interconnected shock absorbers may be mounted on the vehicle. Instead of the two shock absorbers being either connected only with the front or the rear axle, they can be connected one with a front wheel and the other with a rear wheel, in which case the vehicle is stabilized not only about its longitudinal, but also about its transverse axis. The latter is of especial importance, since in that case, the movements of the front of the vehicle in opposite direction to the rear thereof are effectively opposed.

If the shock absorbers are mounted on the vehicle as shown by Figs. 4 and 5, the vehicle is stabilized only about its transverse axis. As shown in Fig. 4, two shock absorbers are mounted each on the same side of the vehicle and are connected with each other, while in Fig. 5 a connected pair of shock absorbers is shown as being mounted at the front and rear of the vehicle.

What I claim as new is:

1. In combination, two opposed shock absorbers, each including a high and a low pressure chamber and a refill chamber, a piston movable between the high and the low pressure chambers of each shock absorber, a check valve controlled connection between each pressure chamber and the refill chamber of each shock absorber permitting flow of fluid from the refill chamber to each pressure chamber and denying reverse flow of the fluid, means providing a duct, separate from said check valve controlled connection, between each pressure chamber and the refill chamber of each shock absorber, a valve cooperating with the duct between the low pressure chamber and the refill chamber of each shock absorber, yieldable means constantly tending to move each valve to a position to permit flow of fluid through the duct controlled thereby, a conduit leading from the duct between the high pressure chamber and the refill chamber of each shock absorber to the valve of the other shock absorber, the valve of each shock absorber being arranged to be moved to a position to deny flow of fluid through the duct controlled thereby between the related low pressure and refill chambers by pressure of the fluid generated in the high pressure chamber of the other shock absorber, each valve being constructed and arranged so that when moved to the position mentioned it establishes communication between the low pressure chamber of the related shock absorber and the high pressure chamber of the other shock absorber.

2. The combination as set forth in claim 1 including a fluid flow control member cooperating with the duct between the high pressure chamber and the refill chamber of each shock absorber, said member being located in said duct between the refill chamber and the point of connection with said duct of the related conduit.

3. The combination as set forth in claim 1 including a fluid flow control member cooperating with the duct between the low pressure chamber and the refill chamber of each shock absorber, said member being located in said duct between the valve and the refill chamber.

4. The combination as set forth in claim 1 including a fluid flow control member cooperating with the duct between the high pressure chamber and the refill chamber of each shock absorber, said member being disposed in said duct between the high pressure chamber and the point of connection with said duct of the related conduit.

5. The combination as set forth in claim 1 in which the valve of each shock absorber is provided with a bore which connects the related duct with the related conduit when the valve is moved to a position to deny flow of fluid between the related low pressure and refill chambers; in which each valve is provided with means to deny flow of fluid through said bore from the related conduit to the related low pressure chamber and to permit flow of fluid in the reverse direction; and in which each valve is provided with a fluid metering opening affording communication between the related conduit and the related low pressure chamber when the valve is in a position denying communication between the related low pressure and refill chambers.

FRITZ ALBERT DEUTSCH.